United States Patent
Kane et al.

(10) Patent No.: US 8,231,012 B2
(45) Date of Patent: Jul. 31, 2012

(54) FILTRATE STORAGE SYSTEM

(75) Inventors: Jeffrey F. Kane, Hudson, MA (US);
Thomas Taylor, Windham, NH (US);
Vito Lore, Somerville, MA (US); Sean Landis Phillips, Lancaster, MA (US)

(73) Assignee: Roush Life Sciences, LLC, Livonia, MI (US)

( * ) Notice: Subject to any disclaimer, the term of this patent is extended or adjusted under 35 U.S.C. 154(b) by 1218 days.

(21) Appl. No.: 12/023,757

(22) Filed: Jan. 31, 2008

(65) Prior Publication Data
US 2009/0026153 A1   Jan. 29, 2009

Related U.S. Application Data

(60) Provisional application No. 60/952,010, filed on Jul. 26, 2007.

(51) Int. Cl.
*B01D 35/00* (2006.01)
(52) U.S. Cl. .................................................. 210/406
(58) Field of Classification Search .................. 210/406
See application file for complete search history.

(56) References Cited

U.S. PATENT DOCUMENTS

| | | | |
|---|---|---|---|
| 1,168,988 A | 1/1916 | Zimmermann | |
| 1,216,112 A | 2/1917 | Greven | 210/477 |
| 1,501,073 A | 7/1924 | Stead | 210/478 |
| 2,460,423 A | 2/1949 | Kracklauer | 210/479 |
| 2,465,623 A * | 3/1949 | Zika | 210/406 |
| 2,584,206 A | 2/1952 | Hodsdon | 210/445 |
| 2,608,843 A | 9/1952 | Kennedy et al. | 65/65 |
| 2,755,935 A | 7/1956 | Richards | 210/149 |
| 2,818,178 A | 12/1957 | Hodsdon | 210/445 |
| 2,896,787 A * | 7/1959 | Roman | 210/406 |
| 3,010,583 A | 10/1959 | Kenyon | 210/406 |
| 3,085,705 A | 4/1963 | Varney | 215/41 |
| 3,286,866 A | 11/1966 | McIntosh | 215/40 |
| 3,319,792 A | 5/1967 | Leder et al. | 210/238 |
| 3,469,369 A | 9/1969 | Helmke | 95/259 |
| 3,478,889 A | 11/1969 | Fessler | 210/406 |
| 3,730,352 A | 5/1973 | Cohen et al. | 210/332 |
| 3,752,651 A | 8/1973 | Bush | 23/230 R |
| 3,838,978 A * | 10/1974 | Eddleman et al. | 422/535 |
| 3,956,125 A | 5/1976 | Strutt et al. | 210/94 |

(Continued)

FOREIGN PATENT DOCUMENTS
DE   33 06 599   8/1984
(Continued)

OTHER PUBLICATIONS

European Patent Office, International Search Report and Written Opinion of the International Searching Authority—Application No. PCT/US2008/052675, dated Jun. 5, 2008 (13 pages).

(Continued)

*Primary Examiner* — Chester Barry
(74) *Attorney, Agent, or Firm* — Sunstein Kann Murphy & Timbers LLP (57) ABSTRACT

A method of removing a filtrate storage bottle from a water bath includes inserting at least two finger underneath a radially protruding lip of a filtrate storage bottle sealing cap and raising the at least two fingers to lift the bottle from the water bath. A side wall portion of the filtrate storage bottle sealing cap is smaller in perimeter than a circle surrounding the radially protruding lip. The cap creates a liquid tight seal with the filtrate storage bottle.

10 Claims, 6 Drawing Sheets

U.S. PATENT DOCUMENTS

| | | | | |
|---|---|---|---|---|
| 4,052,163 | A | 10/1977 | Patzner | 23/259 |
| 4,247,399 | A | 1/1981 | Pitesky | 210/341 |
| 4,251,366 | A * | 2/1981 | Simon et al. | 210/767 |
| 4,301,010 | A | 11/1981 | Eddleman et al. | 210/406 |
| 4,357,240 | A | 11/1982 | Mehra et al. | 210/455 |
| 4,394,266 | A | 7/1983 | Mehra et al. | 210/244 |
| 4,521,308 | A | 6/1985 | Brimhall, Jr. et al. | 210/330 |
| 4,523,934 | A | 6/1985 | Joshua | 55/189 |
| 4,614,585 | A | 9/1986 | Mehra et al. | 210/433.2 |
| 4,673,501 | A | 6/1987 | Wells et al. | 210/406 |
| 4,678,572 | A | 7/1987 | Hehl | 210/232 |
| 4,678,576 | A | 7/1987 | Leoncavallo | 210/433.2 |
| 4,689,147 | A | 8/1987 | Leonvavallo et al. | 210/232 |
| 4,702,834 | A | 10/1987 | Relyea | 210/321.78 |
| D297,860 | S | 9/1988 | Leoncavallo et al. | D24/8 |
| 4,783,318 | A | 11/1988 | Lapakko | 422/101 |
| 4,792,398 | A | 12/1988 | Klein | 210/406 |
| 4,793,245 | A * | 12/1988 | Kimura | 99/292 |
| 4,832,842 | A | 5/1989 | Limb | 210/232 |
| 4,849,061 | A | 7/1989 | Relyea | 156/308.4 |
| 4,894,155 | A | 1/1990 | Leoncavallo et al. | 210/321.84 |
| 4,944,876 | A | 7/1990 | Miller | 210/321.75 |
| 5,049,273 | A * | 9/1991 | Knox | 210/406 |
| 5,108,381 | A * | 4/1992 | Kolozsi | 604/319 |
| 5,112,484 | A | 5/1992 | Zuk, Jr. | 210/247 |
| 5,116,496 | A | 5/1992 | Scott | 210/232 |
| 5,141,639 | A * | 8/1992 | Kraus et al. | 210/321.75 |
| 5,205,989 | A | 4/1993 | Aysta | 422/101 |
| 5,227,137 | A | 7/1993 | Monti et al. | 422/101 |
| 5,234,585 | A * | 8/1993 | Zuk, Jr. | 210/188 |
| 5,264,184 | A | 11/1993 | Aysta | 422/101 |
| 5,283,039 | A | 2/1994 | Aysta | 422/104 |
| 5,308,483 | A | 5/1994 | Sklar et al. | 210/232 |
| 5,375,477 | A * | 12/1994 | Neill et al. | 73/863.23 |
| 5,447,079 | A | 9/1995 | Neill et al. | 73/863.23 |
| 5,603,900 | A | 2/1997 | Clark et al. | 422/101 |
| 5,695,639 | A * | 12/1997 | Johnson | 210/474 |
| 5,785,927 | A | 7/1998 | Scott et al. | 422/104 |
| 5,792,425 | A | 8/1998 | Clark et al. | 422/101 |
| 5,868,928 | A * | 2/1999 | Bradley | 210/257.2 |
| 5,873,967 | A | 2/1999 | Clark et al. | 156/70 |
| D408,284 | S | 4/1999 | Ekkert et al. | D9/453 |
| 5,948,246 | A | 9/1999 | Zuk, Jr. | 210/188 |
| 5,950,849 | A | 9/1999 | Ekkert et al. | 215/252 |
| 6,159,368 | A | 12/2000 | Moring et al. | 210/321.75 |
| 6,338,802 | B1 | 1/2002 | Bodner et al. | 210/650 |
| 6,358,730 | B1 | 3/2002 | Kane | 435/297.5 |
| 6,379,625 | B1 | 4/2002 | Zuk, Jr. | 422/101 |
| 6,419,827 | B1 | 7/2002 | Sandell et al. | 210/321.75 |
| 6,443,314 | B2 | 9/2002 | Shiraiwa et al. | 210/474 |
| 6,451,261 | B1 | 9/2002 | Bodner et al. | 422/99 |
| 6,458,278 | B1 | 10/2002 | Leoncavallo et al. | 210/650 |
| 6,491,873 | B2 | 12/2002 | Roberts et al. | 422/101 |
| 6,506,343 | B1 | 1/2003 | Bodner et al. | 422/65 |
| 6,662,978 | B2 * | 12/2003 | Lin et al. | 222/509 |
| 6,720,417 | B1 | 4/2004 | Walter | 536/25.4 |
| 6,770,203 | B2 | 8/2004 | Leoncavallo et al. | 210/650 |
| 6,783,732 | B2 | 8/2004 | Madden et al. | 422/63 |
| 6,913,152 | B2 | 7/2005 | Zuk, Jr. | 210/406 |
| 6,951,762 | B2 | 10/2005 | Zuk, Jr. | 436/180 |
| 6,974,051 | B1 * | 12/2005 | Lin | 222/25 |
| 6,986,849 | B2 | 1/2006 | Irvine | 210/791 |
| 7,011,755 | B2 | 3/2006 | Zuk, Jr. | 210/416.1 |
| 2002/0096468 | A1 | 7/2002 | Zuk, Jr. | 210/455 |
| 2002/0098125 | A1 | 7/2002 | Roberts et al. | 422/101 |
| 2003/0010708 | A1 | 1/2003 | Leocavallo et al. | 210/477 |
| 2003/0080045 | A1 | 5/2003 | Zuk, Jr. | 210/416.1 |
| 2005/0023172 | A1 | 2/2005 | Ide et al. | 206/446 |
| 2005/0178216 | A1 | 8/2005 | Pitt et al. | 73/863.23 |
| 2007/0144959 | A1 | 6/2007 | Zuk, Jr. | 210/473 |

FOREIGN PATENT DOCUMENTS

| | | |
|---|---|---|
| EP | 0 075 687 | 4/1983 |
| EP | 0 857 961 | 8/1988 |
| EP | 0 223 323 | 5/1990 |
| EP | 1 031 371 | 8/2000 |
| EP | 1 145 752 | 10/2001 |
| GB | 2 250 927 | 6/1992 |
| WO | WO 93/12853 | 7/1993 |
| WO | WO 95/04585 | 2/1995 |
| WO | WO 2007/028157 | 3/2007 |

OTHER PUBLICATIONS

The International Bureau of WIPO, International Preliminary Report on Patentability—Application No. PCT/US2008/052675, dated Jan. 26, 2010 (10 pages).

* cited by examiner

FILTRATE STORAGE SYSTEM

CROSS REFERENCE TO RELATED APPLICATIONS

The present application claims priority from U.S. Provisional Patent Application Ser. No. 60/952,010, filed Jul. 26, 2007, the full disclosure of which is hereby incorporated by reference herein.

The present application is related to applications with the following titles and attorney docket numbers: "Vacuum Base and Related Methods and Apparatus for Vacuum Filtration," Ser. No. 12/023,711; "Methods and Apparatus for Foam Control in a Vacuum Filtration System," Ser. No. 12/023,685; "Methods and Apparatus for Supporting a Vacuum Filtration Device," Ser. No. 12,023,820 all filed on the same date herewith, the full disclosures of which are hereby incorporated by reference herein.

FIELD OF THE INVENTION

The present invention relates to liquid filtration systems, and particularly to caps used during the storage of filtrated liquids.

BACKGROUND ART

Figure 1:
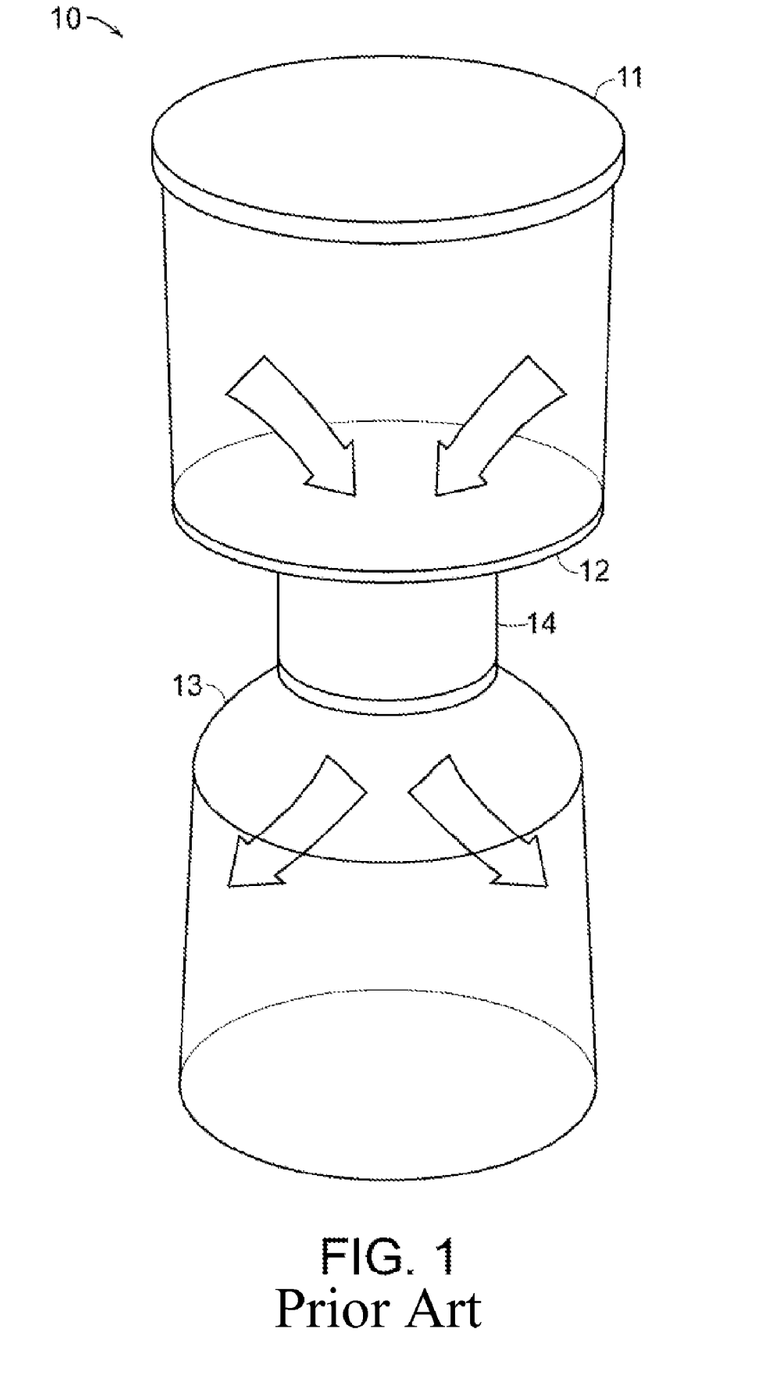
FIG. 1 shows an example of a bottle-top filter device according to the prior art.

Entities such as pharmaceutical companies and university research labs commonly use vacuum filtration sterilization of biological fluids such as cell culture media and buffer solutions. This typically involves what are referred to as bottle-top filters such as the three-piece example shown in FIG. 1. A bottle-top filter device 10 includes an upper unfiltered sample reservoir 11, which is removable and disposable. On the bottom there is a filtrate storage bottle 13 for collecting the liquid filtrate and a vacuum collar 14 with a vacuum port for manual coupling of a vacuum source in between reservoir 11 and storage bottle 13. Vacuum is applied downstream of the filter 12 to create a pressure differential, which draws the sample liquid through the filter into storage bottle 13. The neck of storage bottle 13 may be adapted to receive a cap to close the bottle after filtering is complete and the bottle is disconnected from vacuum collar 14. The components used in the sterilization process are normally sold pre-sterilized.

However, such components and the associated processes have various inherent challenges. For example, potential spills are a significant concern. A spill can disrupt production for up to an entire day and require use of a sanitizing laminar hood. Such spills may occur at any point throughout the filtration process, including after the filtration is complete and the filtrate storage bottle is being handled during further associated tasks.

In addition to the risk of spills and contamination, there are other problems with existing filtration products, particularly with the filtrate storage components. Some of the problems may include difficulties in handling a storage bottle, especially when the bottle is slippery as may be the case when one is removed from a water bath, trouble reading or providing adequate packaging information, and/or storage bottle caps cracking when tightened.

SUMMARY OF THE INVENTION

In accordance with preferred embodiments of the present invention a method of removing a filtrate storage bottle from a water bath is provided. The method includes the steps of: inserting at least two fingers (including the thumb) underneath a radially protruding lip of a filtrate storage bottle sealing cap and raising the at least two fingers to lift the bottle from the water bath. The radially protruding lip has a larger perimeter than a side wall portion of the cap. The cap creates a liquid tight seal with the filtrate storage bottle.

The method may further include the step of reading labeling information on a top surface of the filtrate storage bottle sealing cap.

In accordance with other embodiments of the present invention a method of obtaining a filtered liquid sample is provided. The method includes the steps of: providing a liquid filtration system that includes a reservoir, a filter, and a filtrate storage bottle, filling the reservoir with a liquid medium, creating a pressure differential such that the liquid medium moves through the filter and into the storage bottle, removing the filtrate storage bottle from the liquid filtration system, engaging a filtrate storage bottle sealing cap with the filtrate storage bottle to create a liquid tight seal between the filtrate storage bottle sealing cap and the filtrate storage bottle, depositing the filtrate storage bottle into a water bath, inserting at least two fingers underneath the radially protruding lip of the filtrate storage bottle sealing cap, and raising the at least two fingers to lift the bottle from the water bath. The filtrate storage bottle sealing cap has an upper portion that includes a radially protruding lip.

In another embodiment of the present invention a liquid filtration kit is provided. The kit includes a reservoir, a filtrate storage bottle, a filter for use in between the reservoir and the filtrate storage bottle, and a filtrate storage bottle sealing cap. The filtrate storage bottle sealing cap includes an upper portion have a top surface and a radially protruding lip comprising an outer edge and a side wall portion connected to the upper portion. The side wall portion has an outer surface with a smaller perimeter than the radially protruding lip.

The outer edge of the upper portion of the filtrate storage bottle sealing cap may include surface ridges.

The liquid filtration kit may also include a vacuum collar for coupling a vacuum source such that a pressure differential is created that draws a sample from the reservoir through the filter and into the filtrate storage bottle.

In accordance with other embodiments of the present invention a filtrate storage system is provided. The filtrate storage system includes a filtrate storage bottle and a filtrate storage bottle sealing cap. The filtrate storage bottle sealing cap is characterized by an upper portion and a side wall portion connected to the upper portion. The upper portion has a top surface and a radially protruding lip having an outer edge. The side wall portion has an outer surface with a smaller perimeter than the radially protruding lip.

The outer surface of the side wall portion may decrease in perimeter away from the upper portion, which may be provided with a side wall portion that concaves radially inward. A section of the side wall outer surface may have a constant perimeter.

The top surface of the upper portion may be flat and may be specially adapted to receive labeling information.

The inner surface of the side wall may include threads forming a helical ridge.

The filtrate storage system may include a plurality of ribs connected to the sidewall portion and the radially protruding lip. The plurality of ribs may have a concave profile.

The filtrate storage bottle sealing cap of the filtrate storage system may include a sealing ring extending from a bottom surface of the upper portion.

In accordance with yet other embodiments of the present invention a filtrate storage bottle sealing cap is provided. The cap generally includes an upper portion and a side wall portion connected to the upper portion. The upper portion has a top surface and a radially protruding lip. The side wall portion has an outer surface with a smaller perimeter than the radially protruding lip and an inner surface that includes a thread forming a helical ridge. The cap also includes a plurality of ribs connected to the side wall portion and the radially protruding lip.

DETAILED DESCRIPTION OF SPECIFIC EMBODIMENTS

Figure 2:
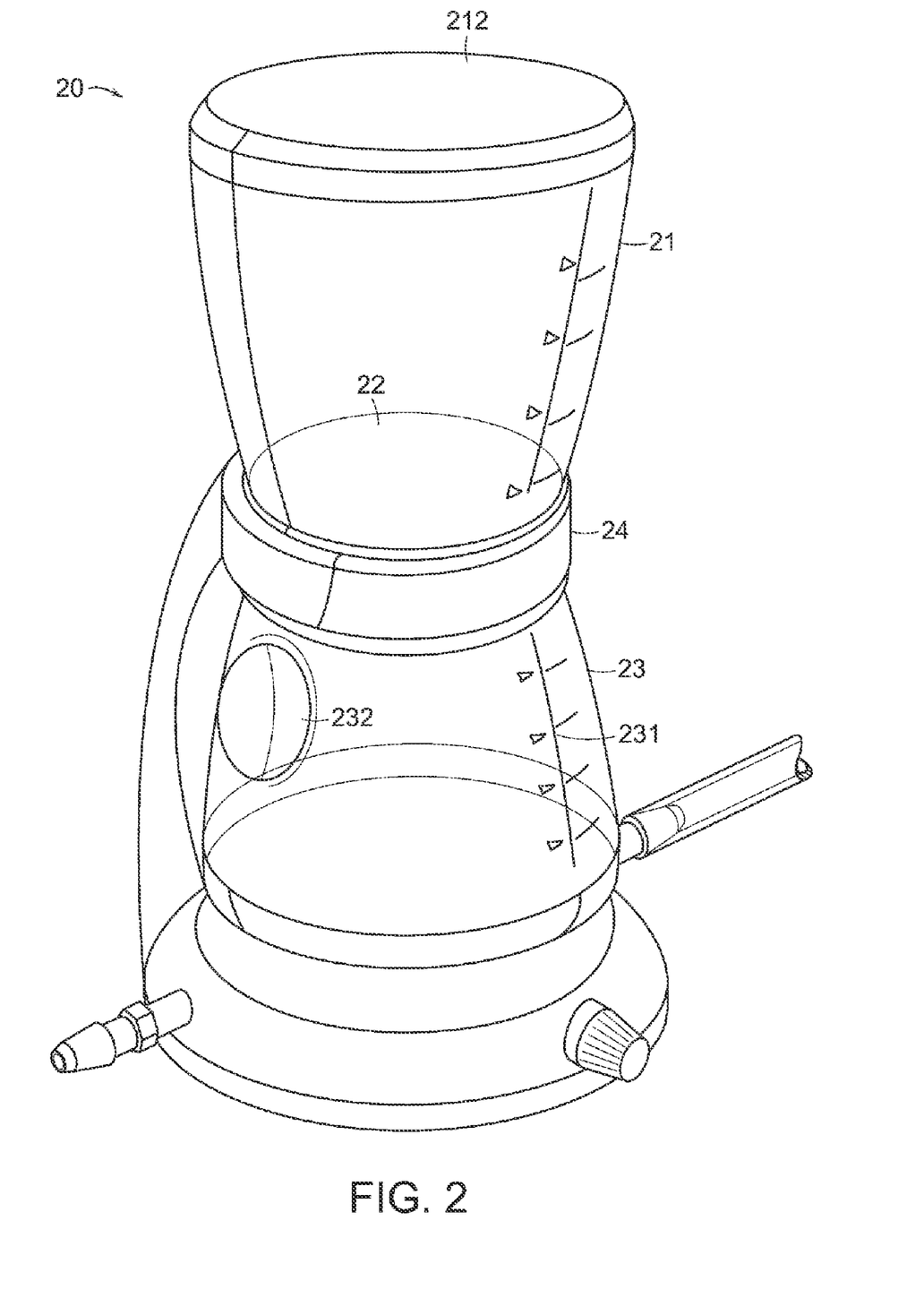
FIG. 2 shows an embodiment of a liquid filtration system for which an embodiment of the present invention may be provided.

FIG. 2 shows a liquid filtration system 20 used to produce filtrate that may be stored using an embodiment of the present invention. The filtration system generally includes a vacuum bottle 23 connected by a vacuum collar 24 to an upper sample reservoir 21, together forming a unified filter assembly. The sample reservoir 21 receives a volume of unfiltered sample liquid and has on its inner bottom a sample filter 22 for mechanically filtering the sample liquid. The vacuum collar 24 is disposed between the sample reservoir 21 and the storage bottle 23 for applying a vacuum to an underside of the sample filter 22, which draws sample liquid through the sample filter into the storage bottle. The storage bottle 23 receives filtered sample liquid from the sample reservoir 21.

The storage bottle 23 may have features to minimize spills and accidents such as a weighted base. The sides of the storage bottle may include opposing flat gripping surfaces 232 for secure handling. After a sample has been filtered, the storage bottle 23, containing the filtrate, may be disconnected from the filtration system and may be covered with a bottle cap 300.

Figure 3:
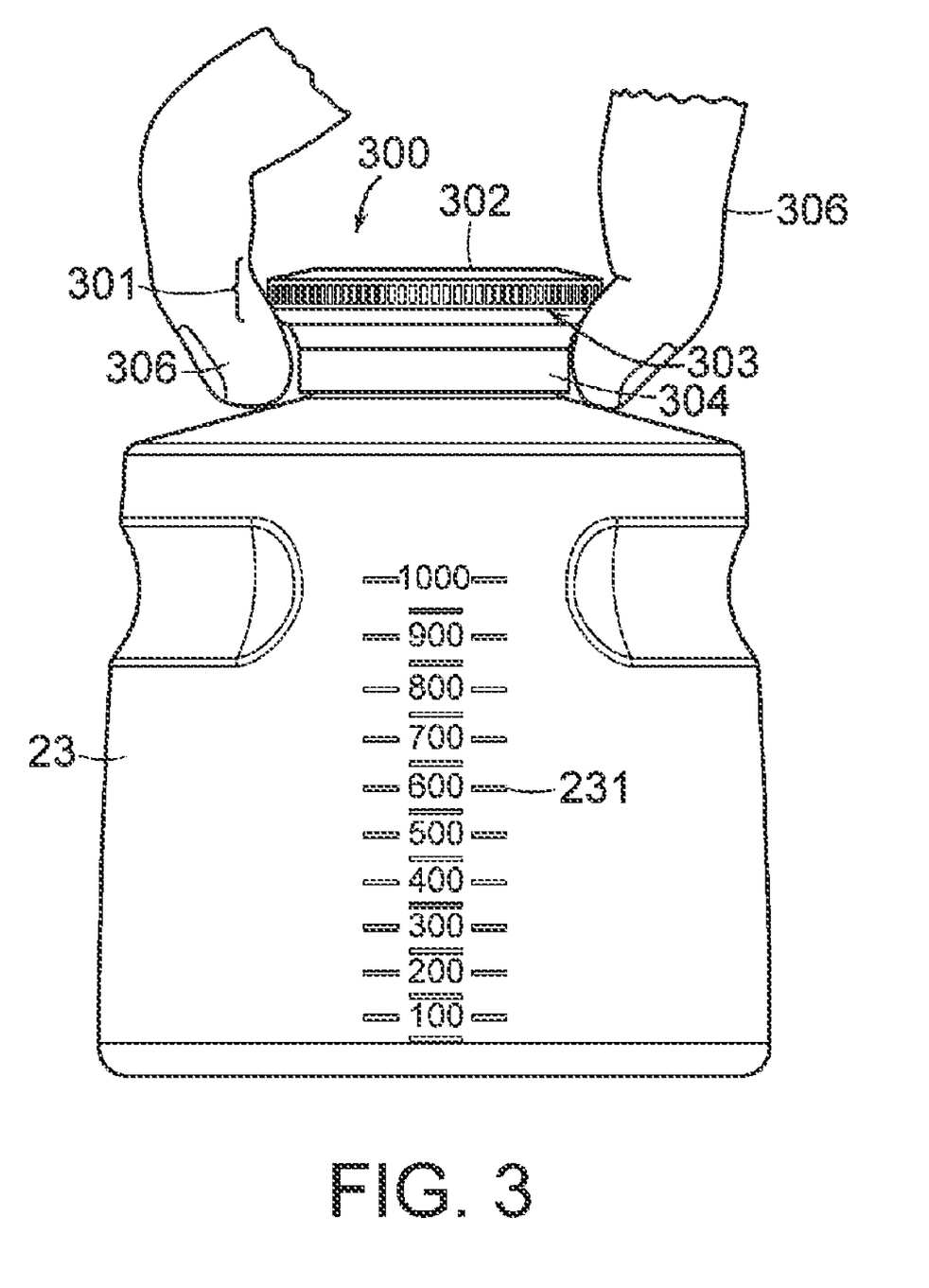
FIG. 3 shows a filtrate storage system in accordance with an embodiment of the present invention.

FIG. 3 shows a filtrate storage system according to an embodiment of the present invention that includes filtrate storage bottle cap 300, which has an upper portion 301 that has a radially protruding lip 303. The lip extends outward such that a circle about its outermost extension has a larger perimeter than side wall 304 of the cap. The outer edge of the lip may be coextensive with a circle or it may be discontinuous. By extending radially outward beyond side wall 304, lip 303 enables easy vertical pick-up and is particularly useful, for example, when storage bottle 23 is placed in a water bath. As illustrated in FIG. 3, cap 300 is particularly suited to be handled in a manner that reduces slippage problems because lip 303 enables a grasping position that causes normal forces applied to the cap by fingers 306 underneath the lid to translate more efficiently or directly into opposing the gravitational forces on the bottle.

The filtrate storage bottle cap may be provided in a form suitable for grasping underneath the cap through various cap embodiments that require the lip of the upper portion of the cap to have a larger perimeter than the side wall of the cap. For example, the side wall may gradually decrease in perimeter further way from the lip providing, for example, a side wall having a concave profile or an inwardly curving profile relative to the center of the cap. Alternatively, the cap may be provided with a side wall whose perimeter is reduced from the perimeter of the lip portion in a step function manner and remains constant at that reduced perimeter for a length of the side wall. The side wall could also be some hybrid of the two configurations described.

Additionally, the top surface 302 of the filtrate storage bottle cap 300 is flat and easy to use for writing and labeling. Top surface 302 may be textured from the manufacturing process. For example, the cap may be molded with a textured top surface. The front of storage bottle 23 may also contain accurate, easy to read graduation marks 231. The top of storage bottle 23 is adapted (e.g., threaded) to be easily connected to and disconnected from the vacuum collar 24.

Figure 4A:
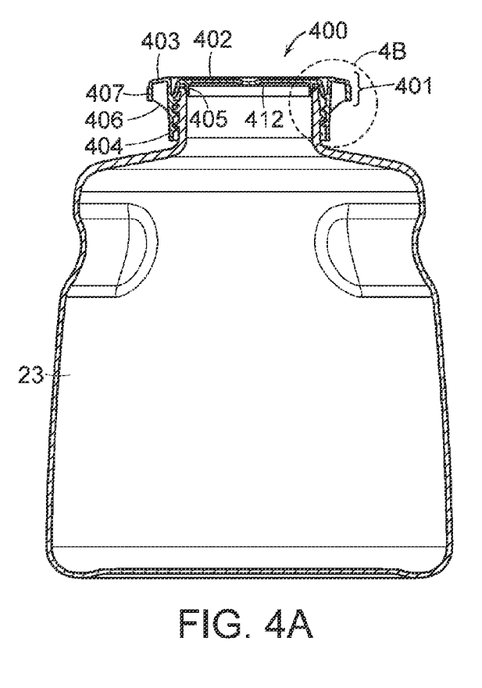
FIGS. 4A-4D show an embodiment of a filtrate storage cap according to the present invention engaged with a filtrate storage bottle.

FIGS. 4A-4D show an embodiment of a filtrate storage cap according to the present invention engaged with a filtrate storage bottle. FIG. 4A is a sectional view of a storage cap 400 according to the present invention installed on bottle 23. Storage cap 400 has an upper section 401 that includes a flat top surface 402 and a radially protruding lip 403. In this embodiment, the lip 403 has an outer edge 408 that includes ridges 407. Ridges 407 provide increased grip when installing or removing cap 400 from bottle 23. Cap 400 further includes sidewall 404 and ribs 406. Ribs 406 are interconnected between sidewall 404 and lip 403 providing increased strength and stiffness to the cap that decreases the likelihood of the cap cracking. The ribs also reinforce lip 403. The ribs may be provided with a concave or an inwardly curving profile.

Figure 4B:
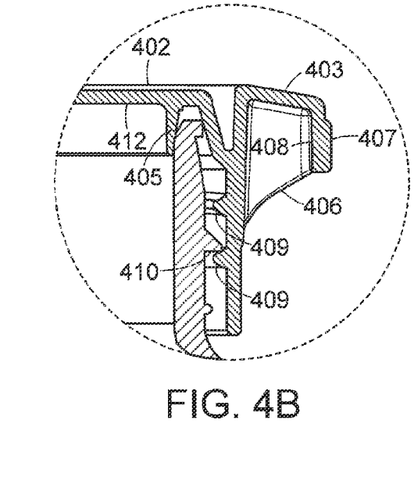

FIG. 4B provides a magnified view of cap 400 engaged with bottle 23. The connection of ribs 406 between sidewall 404 and outer edge 408 of lip 403 is further illustrated in this magnified view. The inner surface of sidewall 404 includes a thread 409 that forms a helical ridge on inner surface 404 so that cap 400 can be rotatably engaged with bottle 23 at the neck of the bottle. The neck of the bottle has a thread 410 that interlocks with thread 409. The interlocking threads 409 and 410 help seal the contents within bottle 23 from the contents outside of the bottle. Cap 400 may also include a sealing ring 405 extending from bottom surface 412 of cap 400. Sealing ring 405 also helps provide a liquid tight seal, preventing the contents within bottle 23 from interacting with the contents outside of the bottle.

Figure 4C:
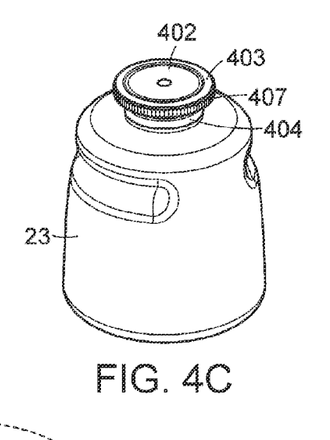

FIG. 4C is a projection view from above of bottle 23 engaged with cap 400. In this view the top flat surface 402 of cap 400 is further illustrated. Additionally, a plurality of ridges 407 located on lip 403 is further illustrated.

Figure 4D:
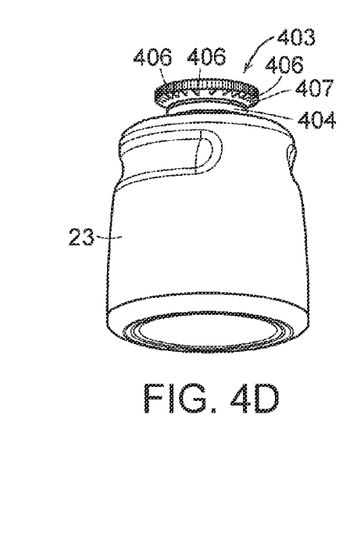

FIG. 4D is a projection view from below of bottle 23 engaged with cap 400. The plurality of ridges 407 are shown in this figure along with the plurality of ribs 406 interconnected between lip 403 and sidewall 404.

Figure 5A:
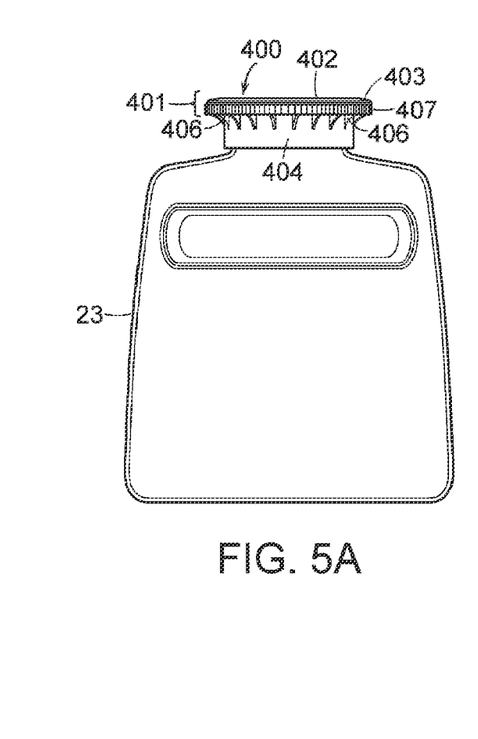
FIGS. 5A-5C show solid model views of a filtrate storage cap according to the present invention engaged with a filtrate storage bottle.
Figure 5B:
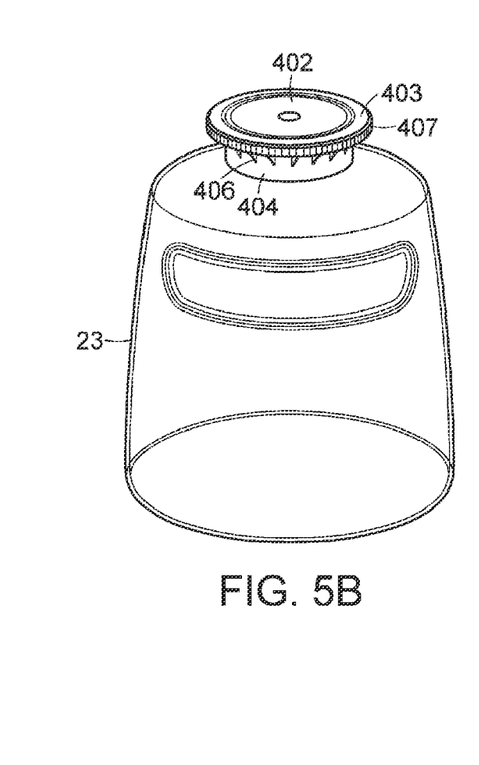
Figure 5C:
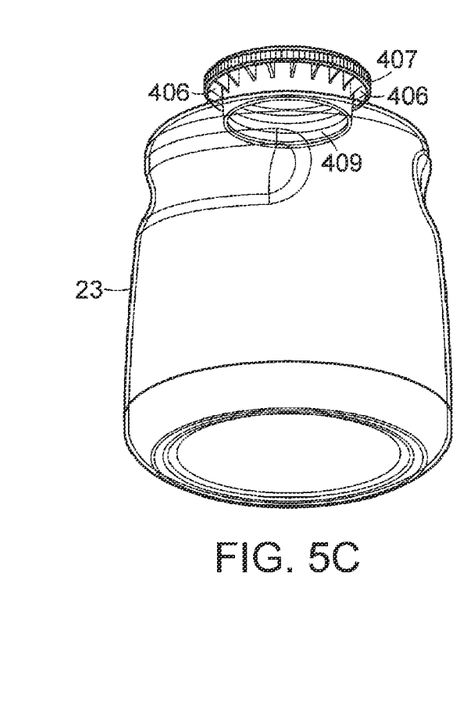

FIGS. 5A-5C show solid model views of a filtrate storage cap according to the present invention engaged with a filtrate storage bottle. FIG. 5A shows a profile view of bottle 23 engaged with cap 400. FIG. 5B shows a projection view from above of FIG. 5A. FIG. 5C illustrates a semitransparent bottle 23 and provides a 3-D view of thread 409 that forms a helical ridge on the inner surface of sidewall 404.

Figure 6:
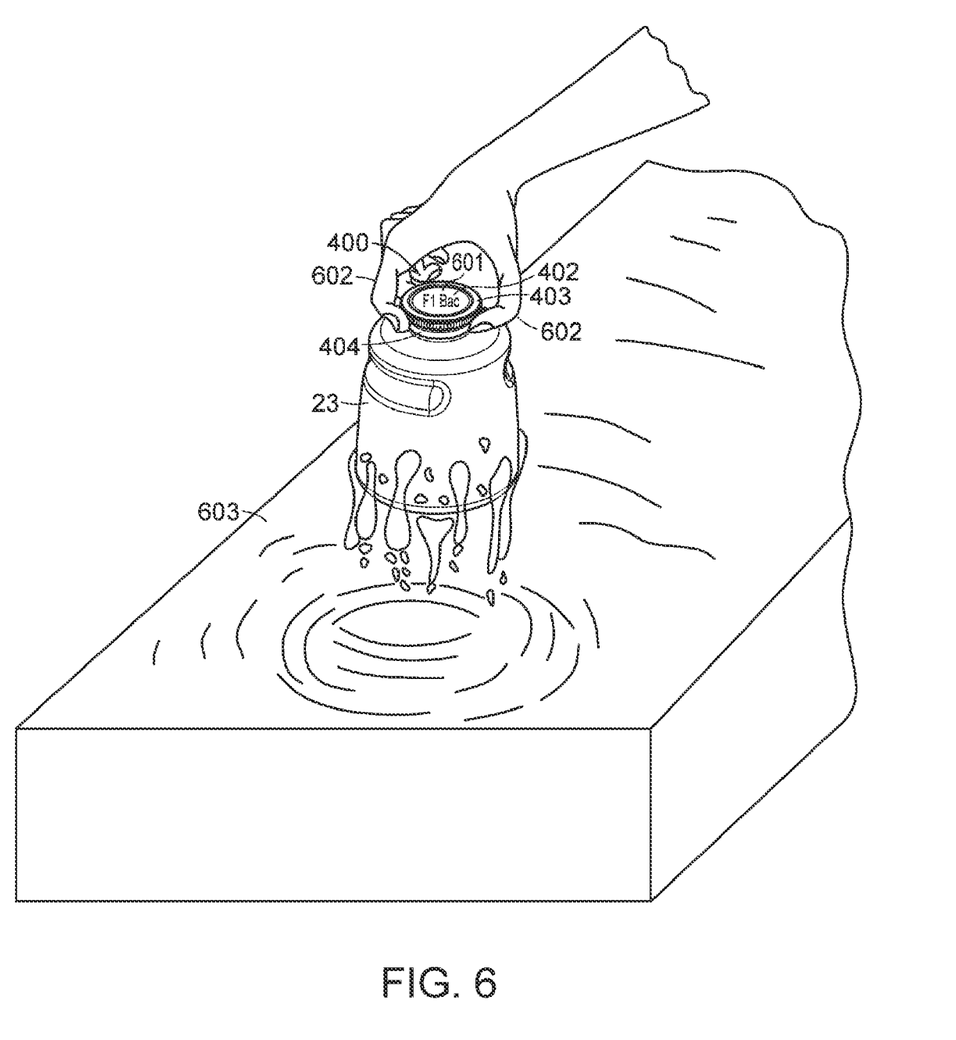
FIG. 6 illustrates a method of removing a filtrate storage bottle from a water bath according to an embodiment of the present invention.

FIG. 6 shows an example of a filtrate storage bottle 23 having a filtrate storage cap thereon being removed from a water bath 603. The cap includes a label 601 on flat top surface 402 that allows the bottle to be easily identified even when in a water bath. Once a bottle has been identified, for example, by a user reading the labeling information, a user may grab the bottle cap by placing at least 2 fingers 602, including a thumb, underneath the radially protruding lip 403, which has a larger perimeter than side wall 404 of cap 400. The user may now easily lift bottle 23 from a location such as the water bath 603 illustrated. The water bath is just one example illustrating where the features of the current invention enhance a filtration storage system, particularly because a water bath is a system where filtered biological fluids might be temporarily stored. The cap further allows the filtrate stored within bottle 23 to remain uncontaminated or commingled even in a liquid environment such as a water bath.

The filtrate storage cap described herein may be produced from a material such as polypropylene. The cap may be manufactured or produced through a process such as injection molding. Other materials and methods of manufacturing may also be used in the make and manufacture of an embodiment of the present invention.

The apparatus described herein is particularly suitable for use in the filtration of cell culture mediums. For example, if a liquid cell culture medium requires some form of filtration to separate particular components out of the medium, a filtration system that includes at least a reservoir, a filter, and a filtrate storage bottle may be provided for the filtration process. The liquid cell culture medium requiring filtration is placed in the reservoir. A pressure differential may then be provided, typically by attaching a vacuum source, to cause the liquid to move from the reservoir through the filter and into the storage bottle. The storage bottle may then be removed from the system and a filtrate storage bottle sealing cap having an upper portion, which includes a radially protruding lip, may then be engaged with the storage bottle, for example, by screwing the lid onto the bottle, to create a liquid tight seal between the filtrate storage bottle sealing cap and the filtrate storage bottle. Labeling information may be applied to the top surface of the cap either by writing directly on the surface or by adhering a label. The bottle may then be placed into a water bath to maintain the filtered liquid at a specific temperature. Once the filtered liquid is ready for further processing, a lab technician, for example, may insert at least two fingers underneath the radially protruding lip of the filtrate storage bottle sealing cap engaged with the filtrate storage bottle and proceed to raise those two fingers in such a manner that the bottle is lifted from the water.

In accordance with an embodiment of the invention, the filtration system may be provided in the form of a kit with disposable components. For example, if a user has a vacuum base adapted for receiving a filtrate storage bottle and applying a vacuum to the filtrate storage bottle, the user may use a kit of disposables provided in accordance with an embodiment of the present invention that includes the following components: a reservoir, a filtrate storage bottle, a filter for use in between the reservoir and the filtrate storage bottle, and a filtrate storage bottle sealing cap that has an upper portion with a top surface and a radially protruding lip with an outer edge as well as a side wall portion connected to the upper portion having an outer surface with a smaller perimeter than the radially protruding lip. All of these components may be provided in a sterilized disposable kit so that the user can use the components as described herein with a vacuum base to filter a particular sample and then dispose of the kit components after the requisite information is gathered. The kit may also include a vacuum collar having a port that mates with a port on the vacuum base to couple a vacuum source through the vacuum base into the vacuum collar and the filtrate storage bottle. The user may proceed to use a new kit, as required, for the filtration of another specimen. This embodiment provides an efficient means of using sterilized components to filter a specimen of interest provided in a liquid medium.

Although various exemplary embodiments of the invention have been disclosed, it should be apparent to those skilled in the art that various changes and modifications can be made that will achieve some of the advantages of the invention without departing from the true scope of the invention.

What is claimed is:

1. A filtrate storage system comprising:
    a filtrate storage bottle; and
    a filtrate storage bottle sealing cap characterized by:
        an upper portion having a top surface and a radially protruding lip comprising an outer edge; and
        a side wall portion connected to the upper portion, the side wall portion having an outer surface with a smaller perimeter than the radially protruding lip, the side wall portion also having an inner surface including a thread forming a helical ridge.

2. A filtrate storage system according to claim 1, wherein the outer edge includes surface ridges thereon.

3. A filtrate storage system according to claim 1, wherein the outer surface of the side wall portion decreases in perimeter away from the upper portion.

4. A filtrate storage system according to claim 1, wherein the outer surface of the side wall portion concaves radially inward.

5. A filtrate storage system according to claim 4, wherein a section of the side wall outer surface has a constant perimeter.

6. A filtrate storage system according to claim 1, wherein the top surface of the upper portion is flat.

7. A filtrate storage system according to claim 1, wherein the top surface of the upper portion is specially adapted to receive labeling information.

8. A filtrate storage system according to claim 1, further comprising a plurality of ribs connected to the side wall portion and the radially protruding lip.

9. A filtrate storage system according to claim 8, wherein the plurality of ribs has a concave profile.

10. A filtrate storage system according to claim 1, further comprising a sealing ring extending from a bottom surface of the upper portion.

* * * * *